April 30, 1940. F. PARDEE 2,199,091
METHOD AND APPARATUS FOR SEPARATING SOLIDS OF DIFFERENT GRAVITIES
Filed Dec. 3, 1938 6 Sheets-Sheet 5
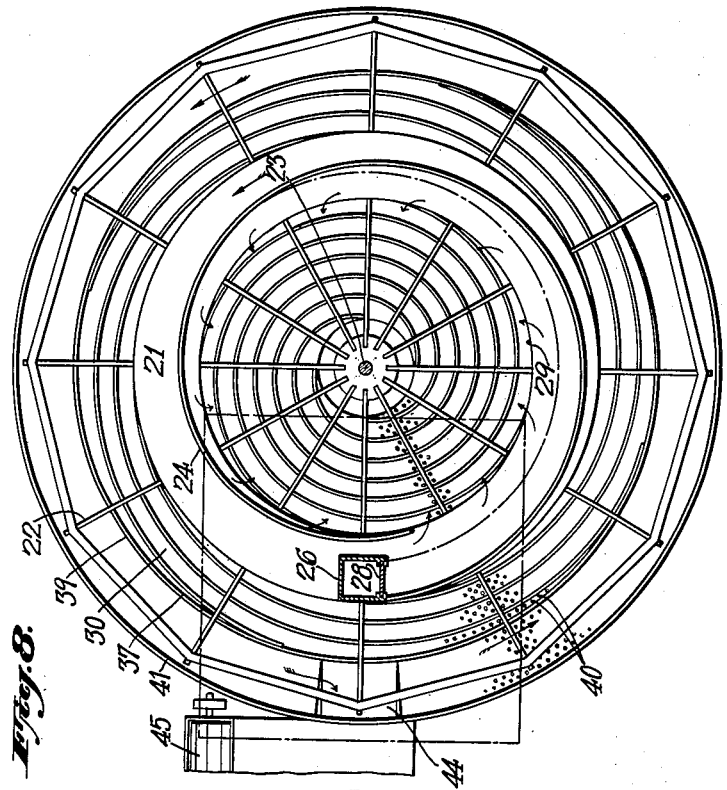
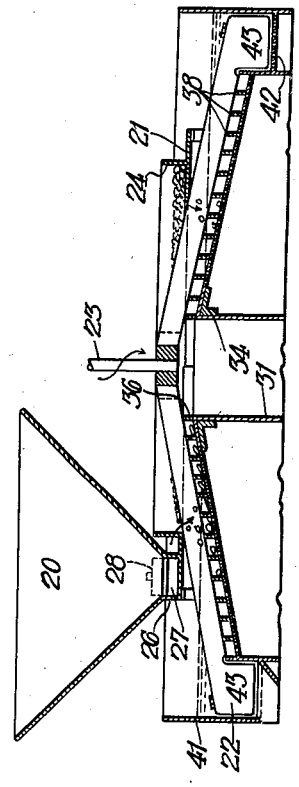
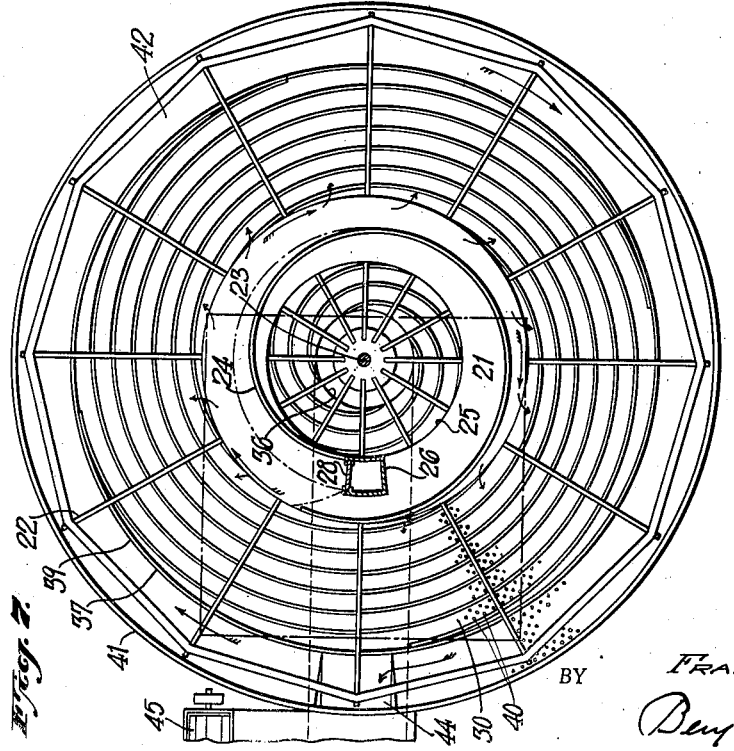
INVENTOR.
FRANK PARDEE.
BY
ATTORNEY.

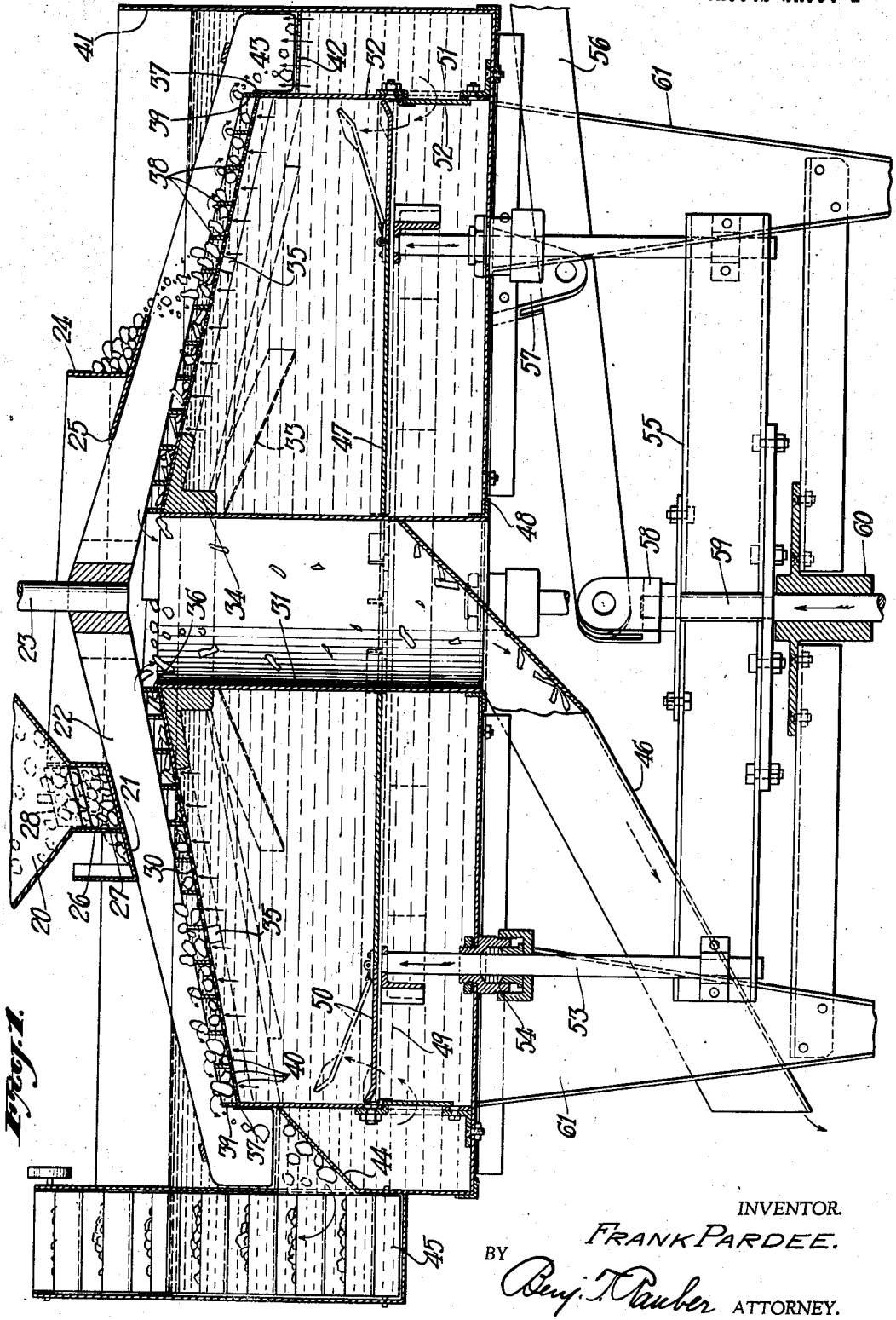

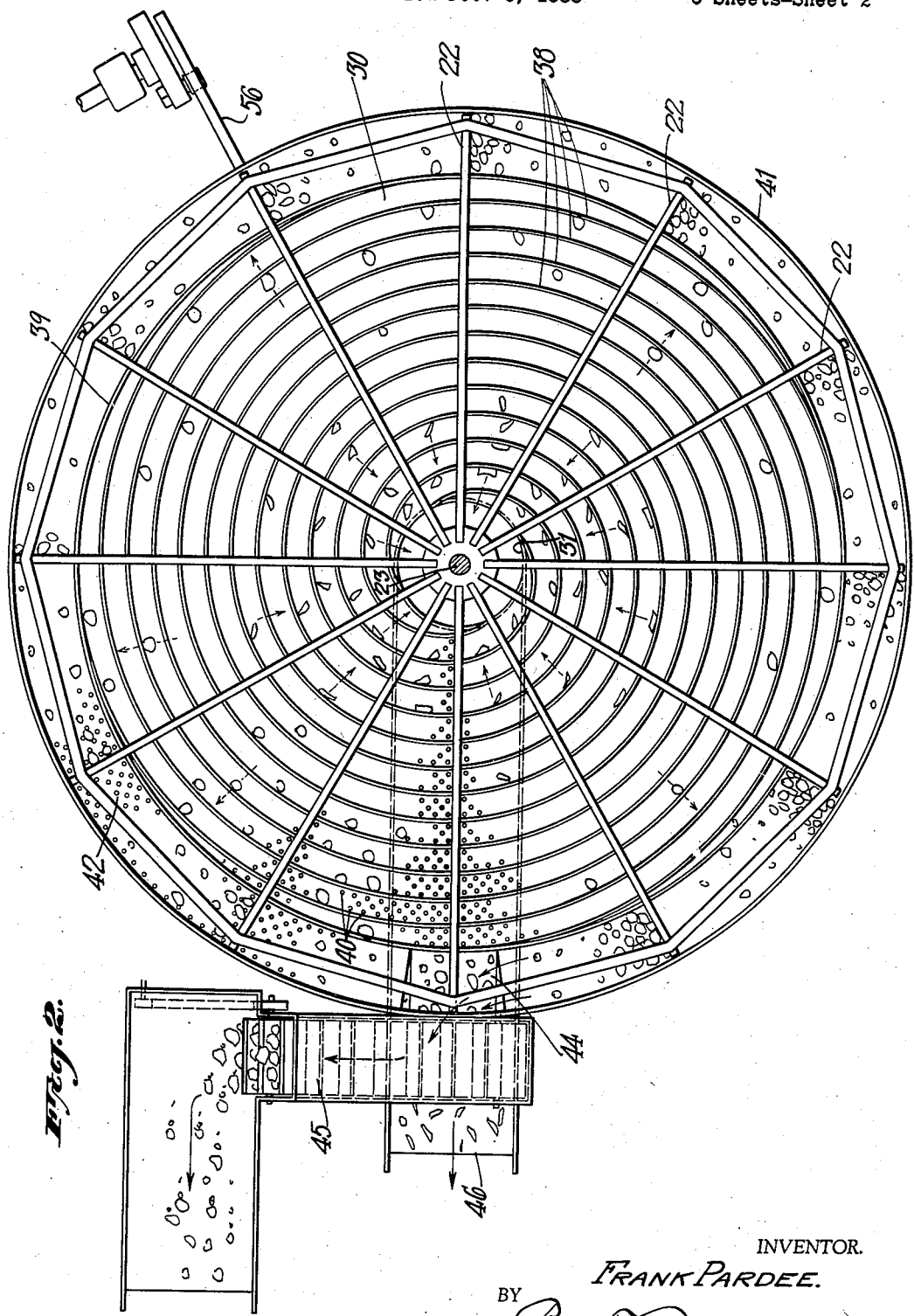

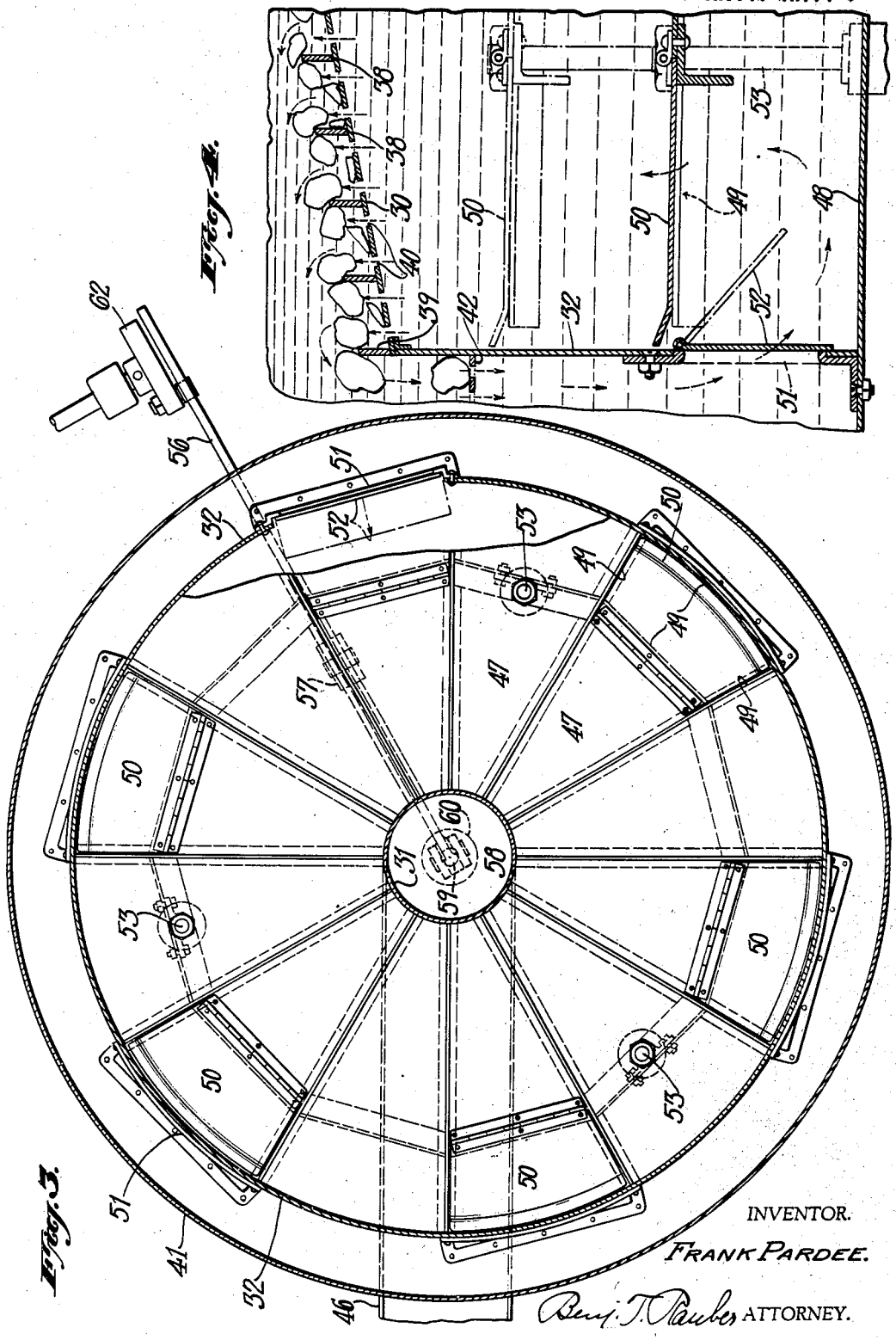

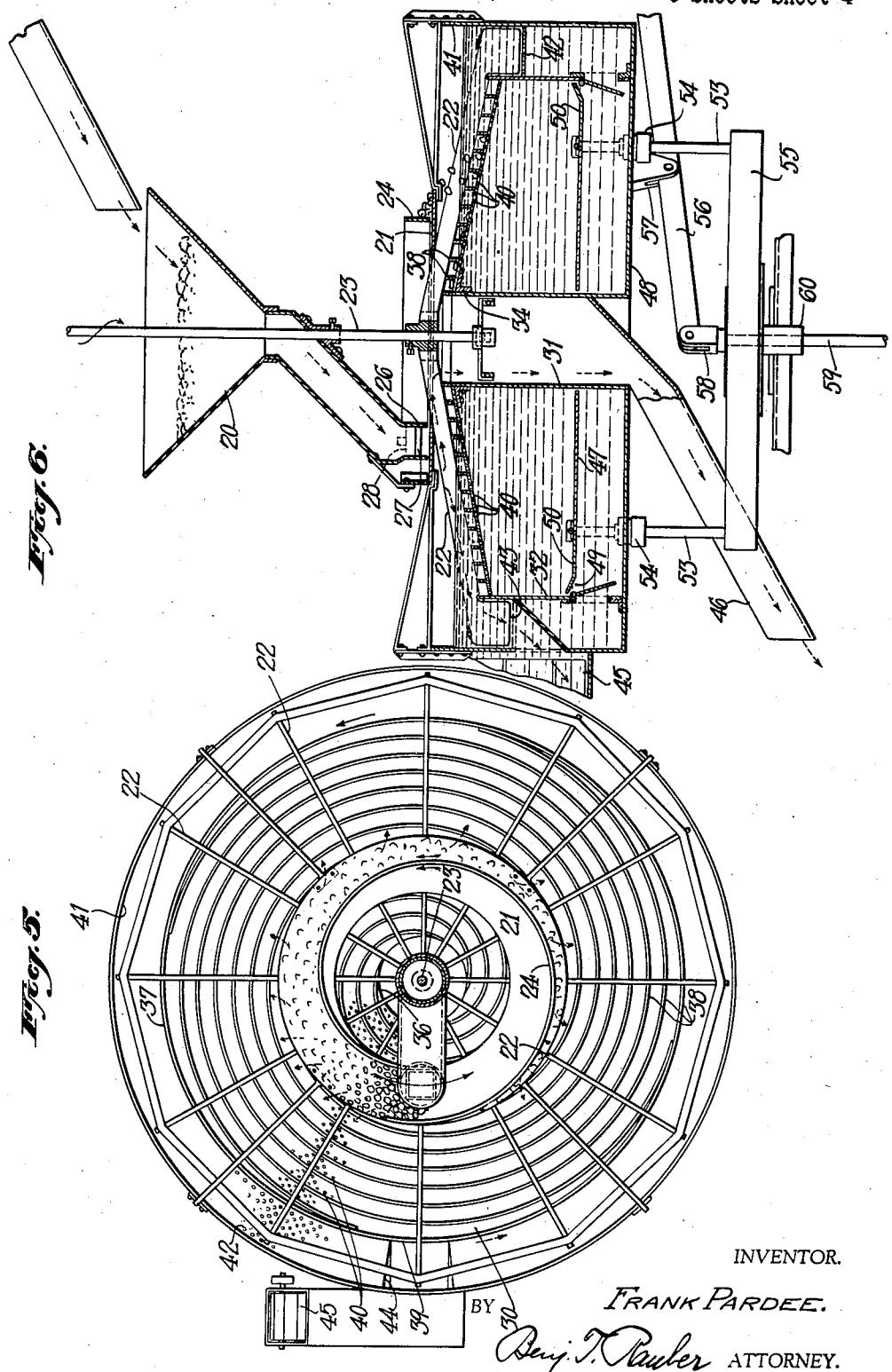

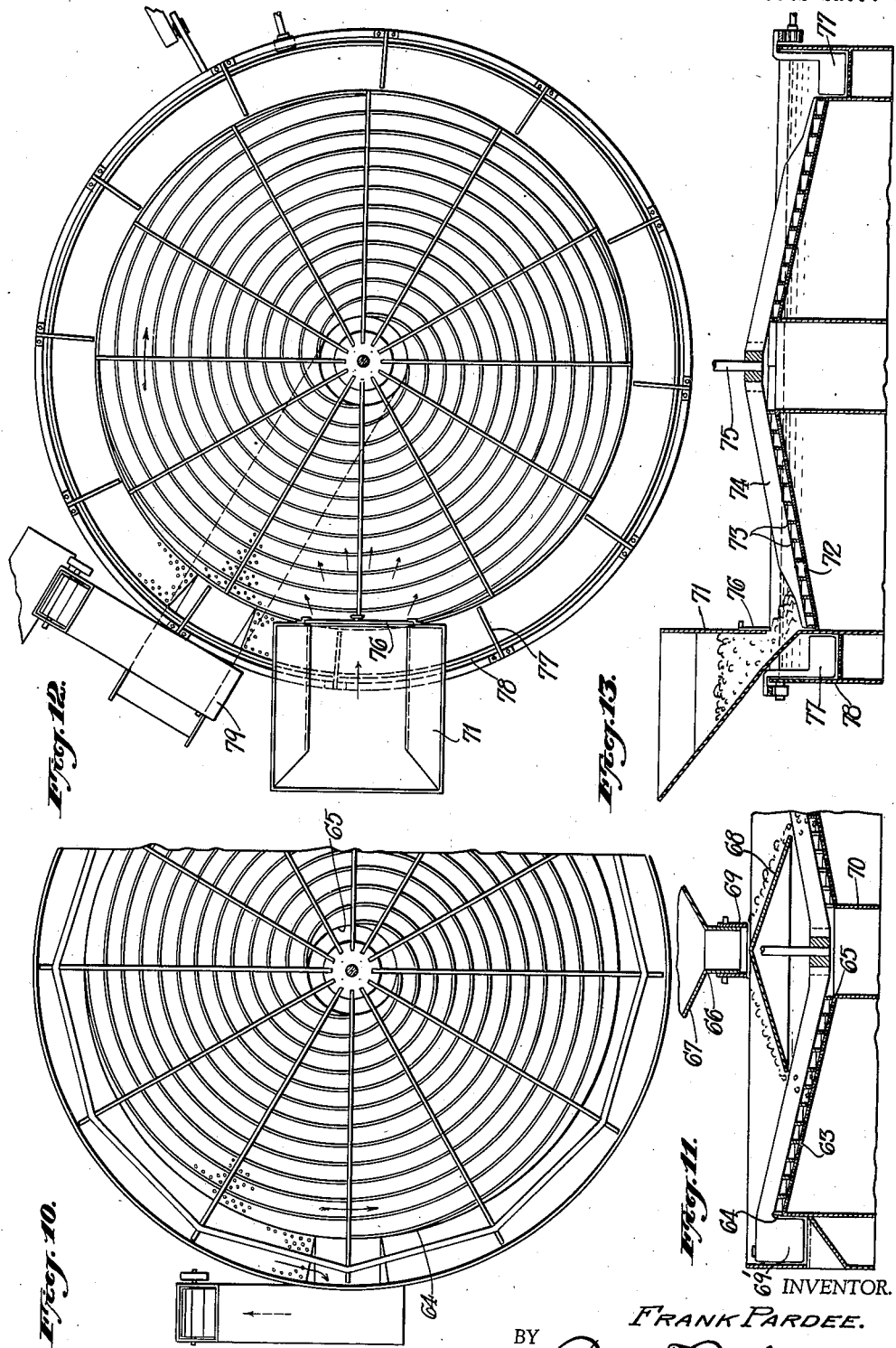

Patented Apr. 30, 1940

2,199,091

UNITED STATES PATENT OFFICE 2,199,091

METHOD AND APPARATUS FOR SEPARATING SOLIDS OF DIFFERENT GRAVITIES

Frank Pardee, Hazleton, Pa., assignor to Anthracite Separator Company, Hazleton, Pa., a corporation of Pennsylvania Application December 3, 1938, Serial No. 243,733

20 Claims. (Cl. 209—455)

My invention relates to a method and apparatus for separating a mixture of solids of different densities or specific gravities such, for example, as a mixture of coal and slate.

Coal as it is mined generally contains slate or other rock. Before the coal can be sold commercially the slate must be removed. In removing the slate it is desirable to avoid, as much as possible, any mechanical handling which would tend to break up the coal by attrition. My present invention provides a method and apparatus whereby the coal may be buoyed and lifted above the slate and separated therefrom with a minimum of movement and of attrition with the slate.

In my invention a mixture of coal and slate, of approximately the same particle size, is fed in successive quantities or continuously, to an inclined plate preferably a conical plate or inverted conical plate, having a discharge opening or edge centrally of the plate and a peripheral discharge edge. Shallow scrapers move over the inclined surface in such a way as to slide or push the material upwardly or against the slope of the surface. At the same time a fluid, such as water or other buoyant fluid, or a fluid mixture comprising liquids, solids, gases, or combinations of them, is circulated upwardly through openings distributed over the surface of the plate and exerts a greater lifting effect on the pieces of coal which are lighter than the pieces of slate or rock and buoys them over the upper edge of the scraper and thence toward the lower edge of the cone.

As the slate is moved progressively upwardly on the inclined surface, it builds up to a thickness approximately equal to the height of the moving scrapers, and because of the incline of the plate and the buoyant action of the fluid flowing upwardly therethrough and downwardly thereover, the coal is carried over the scrapers to the lower edge of the inclined plate. In this way the slate passes over the upper edge and the coal over the lower discharge edge of the plate.

When the conical surface is such that the outer edge is higher than the lower central discharge opening, the scrapers will act to push the material toward the outer edge, but when the surface slopes upwardly toward the inner edge, the scrapers will tend to carry the material toward the upper inner edge. The scrapers may be of any suitable type. However, the spiral scraper or series of concentric spiral scrapers rotated continuously serves effectively to move the material radially inwardly or outwardly according to the arrangement of spirals and direction of rotation.

It will be understood that the rotation of the scrapers over the conical surface is a relative movement and will be accomplished equally well if the conical surface is stationary and the scraper be rotated, or if the scraper be stationary and the surface rotate or if the scraper and conical plate rotate in opposite directions.

The material to be separated or classified into heavier material, such as slate, and lighter material, such as coal, is supplied at an intermediate point on the slope so that any slate carried over with the coal passing to the lowermost edge will be caught and retained by the scrapers below the supply point and moved upwardly. Any coal carried above the point of supply will have an opportunity to be buoyed over the scraper blades and carried downwardly.

The material is preferably distributed uniformly throughout a narrow ring-like zone between the upper and lower edges. In the case of a conical separating surface, this zone is of annular form concentric with and between the inner and outer discharge edges.

In a preferred form of the invention, the material is distributed on an annular plate by a spout that travels circularly over the annular surface and a spiral scraping blade which pushes the material uniformly over the edge of the annular plate. The annular plate may be stationary and the scraper blade and distributing spout rotate, or the blade and spout may be stationary and the plate rotate. The mixture of slate and coal, or other material to be separated, may, however, be distributed by any other suitable distributing means.

The various features of the invention are illustrated by way of example in the accompanying drawings in which—

Fig. 1 is a vertical section of a separating apparatus embodying a preferred form of the invention. Fig. 2 is a plan view of the apparatus shown in Fig. 1. Fig. 3 is a horizontal section taken on the line 3—3 of Fig. 1. Fig. 4 is a vertical section of a part of the apparatus of Fig. 1 taken on a larger scale. Fig. 5 is a plan view of a separator showing a modified distributing means for distributing the material in a circular or annular zone on the separating plate. Fig. 6 is a vertical section through the apparatus of Fig. 5. Fig. 7 is a plan view of the feeding mechanism of the embodiment shown in Fig. 1. Fig. 8 is a plan view and Fig. 9 a vertical section of a modified form of feeding device. Fig. 10 is a plan view and Fig. 11 is a view of a still further modification.

vided with a suitable packing, and is provided at spaced intervals with openings 49 closed by upwardly opening valve plates 50.

Consequently, as the plate 47 moves upwardly the valves 50 close and force the fluid contained above the plate upwardly through the openings 40 in the plate 30, the inner edge of the piston plate 47 forming a sufficiently fluid-tight closure on the central well 31. The fluid thus forced upwardly on the plate 30 overflows the lower edge, thence downwardly through the openings in the bottom plate 42 and enters through openings 51 and past the inwardly opening flap valve 52 to re-enter the space below the plate 47, as indicated by the arrows in Fig. 1. As the plate 47 descends the fluid trapped below it flows upwardly through the openings 49 lifting the valves 50, the valves 52 being closed by the back pressure.

Any suitable means may be employed for reciprocating the piston plate 47. For example, the plate may be supported at suitably spaced intervals by rods 53 secured at their upper ends to the plate 47 and extending through packing boxes 54 in the bottom wall 48 and thence to a connection with a driving head or spider 55. The latter in turn may be reciprocated by means of a rocking lever or walking beam 56 fulcrumed in a hanger 57 from the lower side of the bottom 48 and connected by means of a forked head 58 to a guide stem 59 mounted on the spider 55. The guide stem 59 may be guided in a guide 60 supported centrally at the support leg 61 for the tank structure of the separator. The outer end of the walking beam 56 may be reciprocated by any suitable motive means, indicated at 62 in Fig. 3.

Through the above apparatus, the coal or other material to be separated is delivered in a substantially annular feed between the inner and outer peripheries of an inclined or conically curved plate which is perforated or otherwise permeable to fluid. The lower part of the deposited material is gradually dragged upwardly to a discharge edge for the heavier material, such as slate, while the entire mass is buoyed up at intervals so as to cause the lighter material, such as coal, to rise to the top and roll or flow downwardly with the buoying liquid toward the lower edge.

In the example shown in Figs. 1 to 9, the surface 30 slopes upwardly towards the center so that the lighter material discharges from the outer periphery and the heavier material from the inner periphery. This relationship may, however, be inverted and the coal discharged centrally and the slate, or heavier material, peripherally, where such an arrangement is more advantageous as, for example, where the slate exceeds certain percentages.

For example, where the slate exceeds substantially more than 8% of the mixture, the conical structure of Figs. 10 and 11 may be employed in which a conical plate 63 slopes downwardly from an outer peripheral edge 64 to an inner peripheral edge 65.

The mixture of heavier and lighter solids, such as a mixture of coal and slate is delivered from a delivery spout 66 of the hopper 67 angularly on to a rotating conical distributing plate 68, the rate of feed being controlled by an adjustable control collar 69 about the lower part of the delivery chute 66. The direction of rotation for the spiral shown in Fig. 10 would be counterclockwise and thus tend to carry the slate upwardly toward the periphery where it overflows into an annular channel 69', while the surging buoyant effect of the fluid carries the coal downwardly into a central well 70. The type of feeding cone shown in this figure may be employed with the other separating apparatus of Figs. 1 to 9, and reversely, the feeding mechanisms of Figs. 1 to 9 may be employed with the separating arrangements shown in Figs. 10 and 11.

In the modified arrangement shown in Figs. 12 and 13, the feed hopper 71 is arranged at the side of a plate 72, similar to the separating plate 10 of Fig. 1, and provided with a number of spiral scrapers 73 carried and rotated by radial arms 74 extending from a central shaft 75. A quantity of material to be separated, regulated by a gate 76, flows sidewise out of the hopper 71 on to the plate 72 and is distributed and carried inwardly by the rotating spiral scrapers 73, thereafter the separation of the coal and slate takes place in the same manner as in the apparatus shown in Figs. 1 to 9 inclusive. Separate scrapers 77 are provided in the coal receiving channel 78 to carry the coal therein to a discharge chute and elevator 79.

The sizes of the openings 40 in the plate 30 will be regulated to give any desired speed to the jets issuing from these openings and thus to control the buoyant effect of the fluid. If desired, the density of the fluid may be increased by dissolved or suspended material to increase its buoyant effect, although this is not necessary and any fluid available may be employed.

It will be understood also that the fluid may be introduced in the specific manner shown above, or in any other suitable manner whereby it is introduced between the turns of the spiral and exerts a buoyant effect on the material to be separated. Preferably the current of fluid is given a pulsating or surging effect as this is most effective in causing a separation, but the supply of fluid between the spirals may be continuous.

It will be obvious that the scrapers may be of any suitable shape and mounted in any suitable manner and that any relative movement of scraper and supporting surface may be employed that will serve to push the material upwardly on the surface.

The apparatus as described in the accompanying drawings illustrates the flexibility of the apparatus and its adaptation for various conditions. In the apparatus, the coal and slate respectively pass in short direct paths in opposite directions to the opposite edges of the annular separating plate. The coal, as it is being buoyed by fluid, is carried without attrition and breakage. The apparatus is simple in operation and one with a minimum of wearing parts.

Various modifications in detail may be made by those skilled in the art without departing from the invention as defined in the following claims.

What I claim is:

1. Apparatus of the type described which comprises a material supporting plate permeable to fluid and having a central discharge opening and a peripheral discharge edge, and being inclined radially between said opening and said edge, spirally arranged scrapers of small vertical dimensions to form a substantially continuous barrier to the downward movement of solids on said plate and movable on said plate, means to rotate said scrapers about a central axis to move material toward the upper part of said plate and means to circulate a buoying fluid through said plate to buoy the lighter material over said scrapers to the lower discharge end of said plate and

heavier material is moved by said scraper to the upper edge of said plate and means for causing a pulsation in the fluid supplied to said spiral path.

15. Apparatus of the type described which comprises a conical perforate plate having a central discharge opening and a peripheral discharge edge, spirally extending scraper of small vertical dimension and forming a substantially continuous barrier between said edge and said opening, means to supply material to be separated to said plate, a chamber below said plate, and a plunger in said chamber to force liquid upwardly through said plate to overflow downwardly over said plate and return to said chamber the level of liquid on said plate being below the upper edge of said plate, and means to rotate said scraper in a direction to push material upwardly over said plate and permit the liquid to buoy and carry the uppermost of said material over said scrapers to and over the lower edge of said plate.

16. Apparatus of the type described which comprises a conical perforate plate having a central discharge opening and a peripheral discharge edge, spirally extending scraper of small vertical dimension and forming a substantially continuous barrier between said edge and said opening, means to supply and distribute material in an annular zone to said plate, a chamber below said plate, and a plunger in said chamber to force a liquid upwardly through said plate to overflow downwardly thereover and return to said chamber the level of liquid on said plate being below the upper edge of said plate, and means to rotate said scraper in a direction to push material upwardly over said plate and permit the liquid to buoy and carry the uppermost of said material over said scrapers to and over the lower edge of said plate.

17. Apparatus of the type described which comprises a plate having an inclined surface, a scraper of low vertical dimension moving over said surface to push material up the slope of said surface, means to circulate a buoyant fluid intermittently upwardly through said plate to buoy the lighter particles over the upper edge of said scraper and downwardly on the slope of said plate, and means to supply material to be separated to said plate.

18. Apparatus of the type described which comprises a plate having an inclined surface, scrapers of small vertical dimension on said sloping surface and extending obliquely upwardly on the inclined surface of said plate and movable to push material upwardly on said surface and forming a barrier to the downward movement of material on the surface of said plate, means to circulate a buoyant fluid intermittently upwardly through said plate to buoy lighter material over the upper edge of said scraper, and means to supply material to be separated to the inclined surface of said plate.

19. Apparatus of the type described which comprises a frusto-conical perforate plate having a central discharge opening, a peripheral discharge edge, means to separate a mixture of heavier and lighter materials and to convey one of said materials to said central discharge opening and the other of said materials to said peripheral discharge edge and means to supply material to be separated to said frusto-conical plate, said means comprising a plate above said frusto-conical plate and having a circular discharge edge, means to supply a mixture of material to be separated to said upper supply plate and means to push said mixture uniformly and progressively over said discharge edge and onto said frusto-conical plate in a zone between said peripheral edge and said central opening.

20. The apparatus of claim 19 in which said means for supplying material to and discharging material from said supply plate comprising a rotating chute and a spiral scraper rotatable above said plate to push material over said peripheral edge.

FRANK PARDEE.